United States Patent [19]
Welsh, Jr.

[11] 3,972,263
[45] Aug. 3, 1976

[54] FLOW CONTROL VALVE MEANS FOR A SERVOMOTOR

[75] Inventor: Harold H. Welsh, Jr., South Bend, Ind.

[73] Assignee: The Bendix Corporation, South Bend, Ind.

[22] Filed: Feb. 19, 1975

[21] Appl. No.: 551,223

[52] U.S. Cl. .................................. 91/6; 91/31; 91/369 A; 91/376 R; 92/78; 55/309
[51] Int. Cl.² .................. F15B 9/10; F15B 21/04; F01B 25/02
[58] Field of Search .................. 92/78, 376 R; 91/6, 91/31, 32, 369 A; 55/309

[56] References Cited
UNITED STATES PATENTS

| | | | |
|---|---|---|---|
| 2,840,183 | 6/1958 | George | 55/309 |
| 3,106,873 | 10/1963 | Cripe | 9/369 A |
| 3,289,547 | 12/1966 | Kytta | 91/376 R |

Primary Examiner—Paul E. Maslousky
Attorney, Agent, or Firm—Leo H. McCormick, Jr.; William N. Antonis

[57] ABSTRACT

A flow control apparatus for use in a servomotor to control the rate of the flow of air through a hub to a control valve. A push rod has a first section connected to the control valve and a second section through which an operator supplies an operational input signal. A truncated resilient disc holds the first and second sections of the push rod away from each other. A filter surrounds the second section and extends radially to fill the interior of the hub. A series of projections extend rearwardly from the truncated resilient disc along the exterior of the filter. When the operator desires to begin a braking sequence, an input force is applied from the operator through the second section into the truncated resilient disc to the first section to actuate the control valve. With the control valve actuated, air will flow from the atmosphere through the filter into the servomotor. As the input force increases, the truncated resilient disc will be flattened which will cause the projections to contract and compress the filter toward the second section. With the filter compressed, air will flow directly into the control valve without being restricted by the filter and thereby reduce the response time for the servomotor to be actuated by the operator.

7 Claims, 3 Drawing Figures

FLOW CONTROL VALVE MEANS FOR A SERVOMOTOR

BACKGROUND OF THE INVENTION

Initially, pneumatic servomotors such as disclosed in U.S. Pat. No. 3,106,873 were constructed in a manner such that air from the environment directly entered the rear chamber thereof to create the operational pressure needed to operate the master cylinder during a braking application. However, after a period of time during which the brakes were repeatedly applied, because of the contaminants carried by the air, the control valves became inoperative. Consequently, an in-line filter was placed in the air supply conduit to prevent contaminants from being communicated to the valve means. As a result, valve stability was enhanced and the noise caused by the air entering the vacuum chamber attenuated. Unfortunately, use of such an in-line filter arrangement results in an increase in the time interval required to create the desired maximum pressure differential. However, the time interval for creation of the maximum pressure differential was completely adequate until the introduction of emission control devices in which the available vacuum produced at the intake manifold of most vehicles was reduced thereby correspondingly reducing the maximum potential pressure differential. As a result, during brake standardization tests established by the Department of Transportation some vehicles could not stop within the set braking distances.

Keeping in mind that a fast brake application, wherein maximum pressure build-up is needed, will only occur during a panic stop, a servomotor was disclosed in U.S. Pat. No. 3,897,716 having a flow control system wherein during a brake application, environmental air will proportionally bypass the filtering means in the servomotor as a function of the pressure differential developed across the filtering means in response to an input actuation force.

SUMMARY OF THE INVENTION

I have devised a fluid flow control means which will respond to the input force applied by an operator through a two piece push rod means resiliently held apart by a truncated resilient disc. The truncated resilient disc has a plurality of tabs radially extending therefrom. Each of the tabs has a rearwardly extending projection which engages the interior of the hub which retains the control valve. A filter surrounds the rear section of the push rod and radially extends to the interior of the hub into engagement with the projections on the tabs. Upon a brake application the input force is transmitted through the truncated resilient disc to operate the control valve means in the hub which regulates the rate through which the operational pressure differential will be developed in the servomotor. During a normal application the input force will be transmitted through the truncated resilient disc to allow air to be communicated to the control valve means after passing through the filter. If the input force is sufficiently strong enough to overcome the resiliency of the truncated resilient disc, the tabs will pivot causing the rearwardly extending projections to compress the filter and allow air to be communicated to the control valve means without passing through the filter to establish the operational pressure differential in a shorter period of time.

It is therefore the object of this invention to provide a servomotor with a force responsive flow control means for regulating the flow path through which an actuation fluid will be supplied to an operational valve.

It is another object of this invention to provide a flow control means with a resilient separator through which an operational input force is transmitted to a control valve for establishing a flow path for a fluid.

It is still a further object of this invention to provide a servomotor with a flow control means for moving a filter out of a flow path in response to an input force to reduce the time required in presenting an operational fluid to a regulator valve.

These and other objects of this invention will become apparent from reading this specification and viewing the drawings.

DETAILED DESCRIPTION OF THE PREFERRED EMBODIMENT

Figure 1:
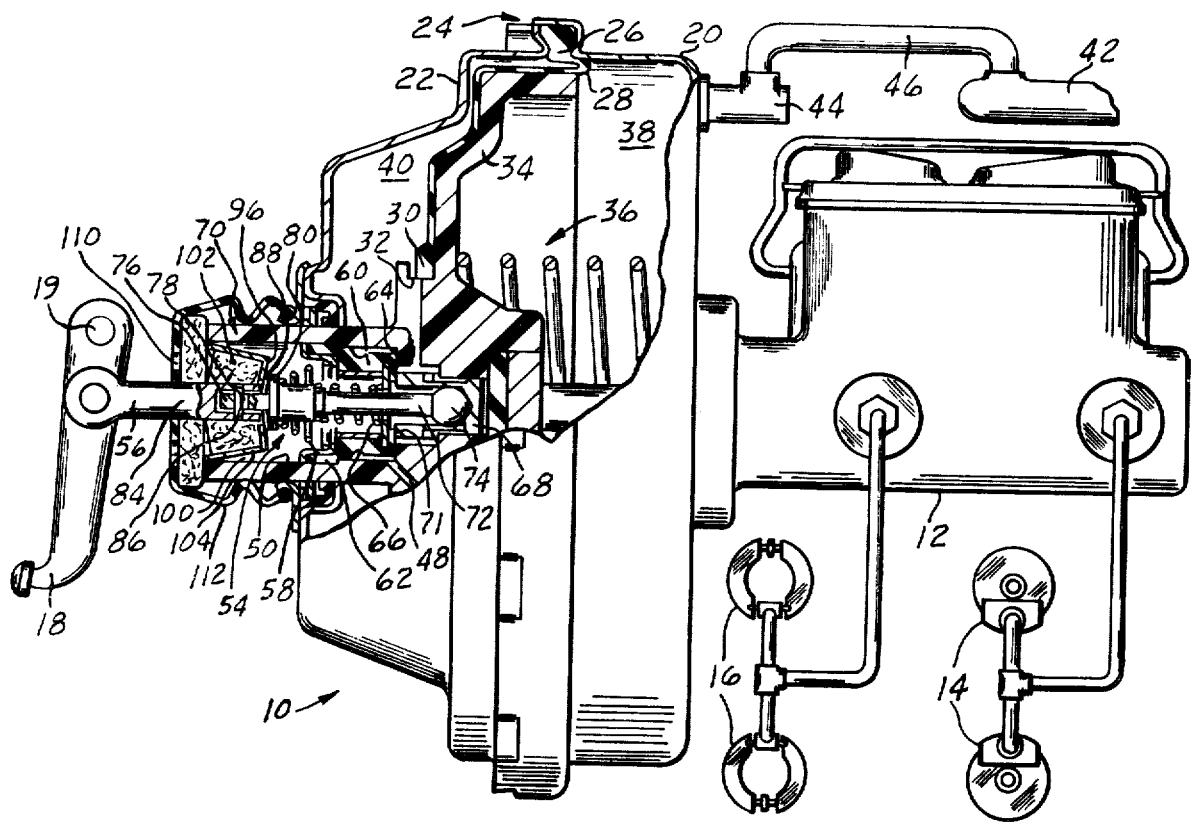
FIG. 1 is a schematic view of a power brake system having a sectional view of a servomotor having a flow control means through which air is supplied to a control valve for developing a pressure differential in response to an input force.

In the braking system shown in FIG. 1, a servomotor means 10 is connected to a master cylinder 12 which supplies the front wheel brakes 14 and the rear wheel brakes 16 with a hydraulic fluid under pressure in response to an actuation input force being applied to the foot pedal 18 by an operator.

The servomotor means 10 has a front shell 20 joined to a rear shell 22 by a twist lock means 24. The twist lock means 24 holds an external peripheral bead 26 of the diaphragm 28 while an internal peripheral bead 30 snaps into a groove 32 adjacent the wall 34 radiating from the hub means 36. The wall 34 and the diaphragm 28 separate the area between the front shell 20 and the rear shell 22 into a front chamber 38 and a rear chamber 40. The front chamber 38 is connected to a source of vacuum, such as an intake manifold 42, through check valve 44 in conduit 46. The front chamber 38 is connected to the rear chamber 40 through the interconnection of a first passage 48 which extends into an axial bore 50 in the hub means 36 and a second passage 52 which extends from the axial bore to the rear chamber 40.

A control valve means 54 located in the axial bore is positioned by a return spring 58 acting on push rod means 56 to regulate the communication of vacuum from the first passage into the axial bore 50. The control valve means 54 includes a poppet member 60 which has one end 62 secured to the hub means 36 and the other end 64 centrally located in the axial bore 50 by coil spring 66. In the released position, as shown in FIG. 1, the return spring 58 acts on the plunger 68 to move the atmospheric seat 71 thereon against the end 64 in opposition to the coil spring 66 to prevent the air in the environment from entering the second passage 52 through bore 50.

The air is presented to the control valve means 54 through a flow control means 70 as a function of the input force applied to pedal 18 by the operator.

The push rod means 56 has a first section 72 with a spherical end 74 on the end thereof which is retained in the plunger 68. The spherical end 74 will allow the plunger to move axially as the push rod means 56 moves through an arc created by lever 18 pivoting on pin 19. The first section 72 has a cylindrical end 76, see FIG. 2, which extends from a shoulder 80. A slot 78 is located in the cylindrical end 76. The cylindrical end 76 is sized to fit into an axial bore 82 on the end of a second section 84 of the push rod means 56. A pin or other keeper means 86 extends through the slot 78 and axial bore 82 to secure the first section 72 to the second section 84.

The flow control means 70 includes a truncated resilient disc 88, a Belleville washer, being a well-known example. The truncated resilient disc 88 is located between shoulder 80 and the end 90 of the second section 84. The base 92 of the truncated resilient disc 88 is located on the shoulder 80 while the apex 94 extends toward the cylindrical end 76 and engages end 90 on the second section 84. The resiliency of the truncated resilient disc 88 acts on end 90 to hold pin 86 against the end 79 of slot 78. A plurality of tabs 96 attached to face 91 radially extend from the truncated resilient disc 88. A corresponding plurality of arms 98 extend rearwardly at substantially 90° from the tabs 96 until engagement is made with the interior 100 of the hub means 36.

A first filter 102 which surrounds the second section 84 of the push rod means 56 extends to the interior 100 of the hub means 36. The filter 102 has a tapered surface 104 such that it engages the rearward projecting arms 98.

A second filter 106 abuts the end 108 of the hub means 36 to precondition the air from the environment as it passes through holes 110 in dust boot 112.

MODE OF OPERATION OF THE PREFERRED EMBODIMENT

When an operator desires to stop the vehicle, an input force is applied to the push rod means 56 by the brake pedal 18. This input force will move the second section 84 and transfer a force through the truncated resilient disc 88 to the first section 72 which will sequentially move the plunger 68 and allow spring 66 to seat the end 64 of the poppet 60 on the vacuum seat 71. This will interrupt vacuum communication between passage 48 and the bore 50. Further movement of the plunger 68 will move the atmospheric seat 71 away from the end 64 of the poppet 60 to allow air to enter the rear chamber 40 after flowing along a primary flow path through the filters 102 and 106. As the air enters the rear chamber 40, a pressure differential will be created across the wall means 36. This pressure differential will cause the wall means 36 to move and impart an actuation force to output rod 35 which will operate the master cylinder 12 to supply the wheel brakes 14 and 16 with pressurized fluid to bring about braking in the vehicle.

Figure 2:
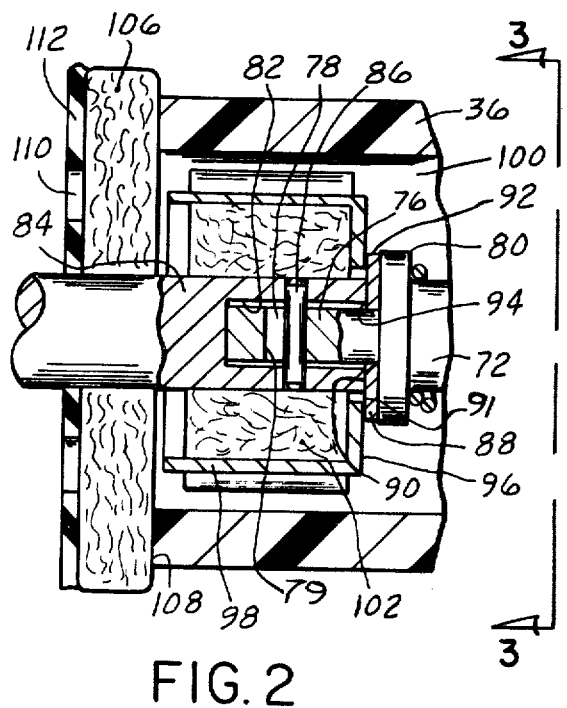
FIG. 2 is a sectional view of the flow control means of FIG. 1.
Figure 3:
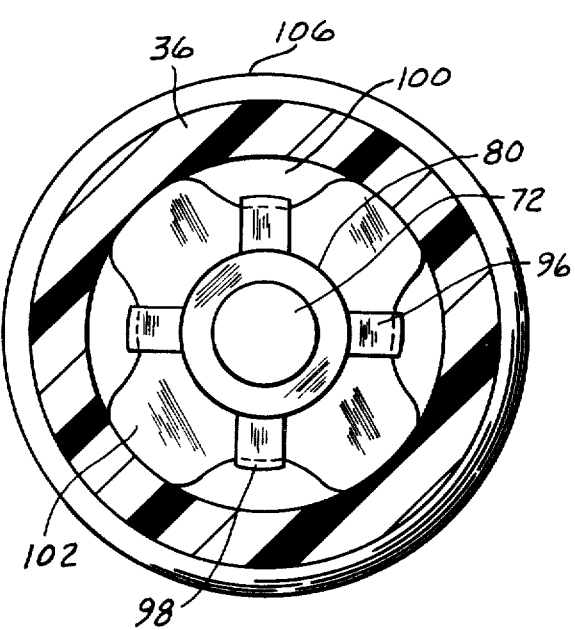
FIG. 3 is a sectional view taken along lines 3—3 of FIG. 2.

If the reactionary operational force carried back through the first section 72 of the push rod means 56 offers a predetermined resistance to the input force being communicated through the second section of the push rod means 56, the truncated resilient disc 88 will collapse in a manner as shown in FIG. 2. When the truncated resilient disc 88 collapses, apex 94 will pivot about base 92 and move toward shoulder 80 causing tabs 96 to approach a radial position with respect to the second section 84. Since the arms 98 are located at an angle of 90° to tabs 96, as apex 94 approaches shoulder 80 the arms 98 move toward the second section 84, and compress the filter 102 in a manner as shown in FIG. 3. With the filter compressed, air from the atmosphere can bypass filter 102 and rapidly be presented to the control valve means 54 for distribution to the rear chamber 40. Thus, the air from the atmosphere is provided with a temporary secondary flow path in order to reach the control valve means 54 during a period when a rapid build-up of the pressure differential is needed to meet a braking demand.

I claim:

1. In a servomotor having a wall means movable in response to a first fluid flowing through a first flow path in a hub means upon movement of a control valve means to establish a pressure differential thereacross with a second fluid in response to an input force by an operator, flow control means for providing a flow path for the first fluid commensurate with the input force from the operator, said flow control means comprising:
    push rod means having a first section connected to the control valve means and a second section connected to an input member;
    resilient means separating the first section and the second section of the push rod means;
    filter means surrounding said second section and substantially filling said hub means; and
    projection means connected to the resilient means and the filter means, said input member transmitting an operational input force to the second section through the resilient means and to the first section for operating said control valve means to allow the first fluid to flow through the filter means to establish said first flow path, said input force overcoming said resilient means causing the projection means to compress the filter means and establish said second flow path for the transmission of the first fluid through the hub means to the control valve means.

2. In the servomotor, as recited in claim 1, wherein said push rod means further includes:
    keeper means for joining the first section with the second section, said keeper means permitting the first and second sections to move with respect to each other.

3. In the servomotor, as recited in claim 2, wherein said first section of the push rod means includes:
    a cylindrical body having a first end and a second end, said first end having a spherical surface for engaging said control valve means, said second end having a slot adjacent thereto, said cylindrical body having a shoulder located between said slot and the first end.

4. In the servomotor, as recited in claim 3, wherein said second section of the push rod means includes:
    an axial bore on one end thereof for retention of said second end of the first section.

5. In the servomotor, as recited in claim 4, wherein said keeper means includes:
    pin means which is fixed to the second section of the push rod means and extends through the slot in the first section of the push rod means, said pin means moving in said slot when the input force overcomes the resilient means to allow the projection means to pivot toward the second section.

6. In the servomotor, as recited in claim 5, wherein said resilient means is a truncated resilient disc which is located between said shoulder on the first section and said one end on the second section of the push rod means.

7. In the servomotor, as recited in claim 6, wherein said projection means includes:

a plurality of arms fixed to the truncated resilient disc and extending along the peripheral surface of the filter means.

* * * * *